United States Patent Office 3,491,283
Patented Jan. 20, 1970

3,491,283
SYSTEM FOR CONTROLLING ALTERNATING
CURRENT POWER IN ACCORDANCE WITH
A DIGITAL CONTROL SIGNAL
James Stewart Johnston, Bognor Regis, England, assignor to Rosemount Engineering Company Limited, Bognor Regis, England, a British company
Filed July 18, 1967, Ser. No. 654,269
Claims priority, application Great Britain, July 20, 1966, 32,645/66
Int. Cl. H02m 1/08
U.S. Cl. 321—16
18 Claims

ABSTRACT OF THE DISCLOSURE

Electrical power in a load circuit is controlled by a digital control signal using scaling means to produce, from an input train of pulses, a number of trains of pulses at different frequencies, the frequencies corresponding to the significance of the various digits in the control signal, which trains are separately gated by the appropriate digits of the control signal. The gated trains are arranged to have non-coincident pulses and are used to fire a controlled rectifier in the load circuit either directly or after processing using a bi-directional counter to obtain an integral and/or derivative component for combining with the proportional component.

---

This invention relates to systems for controlling electrical power and is directed more particularly to enabling power from an alternating current source to be controlled in accordance with a control signal in binary digital form.

According to this invention a system for controlling power in an electrical circuit in accordance with a digital control signal comprises scaling means providing, from an input pulse train, non-coincident output pulses at frequencies corresponding, in decreasing order, to the decreating significance of successive digits of the control signal, gates for controlling the feeding of said output pulses to a common output circuit, control means for said gates arranged to feed output pulses of the respective frequencies to said output circuit in accordance with the magnitudes of the corresponding digits of the digital control signal, the digit of highest significance controlling the pulses from the scaling means at the highest frequency and the successive digits of lesser significance controlling the pulses at the successive lower frequencies, a source of alternating power having a frequency at least as high as the maximum frequency of pulses in said output circuit, and controlled rectifier means in said electrical circuit for controlling the power from said source, the controlled rectifier means being triggered in succession by the various pulses in said output circuit.

Conveniently a binary coded control signal is employed; this may be in various codes, e.g. a binary coded decimal signal. To explain the invention, it is convenient to consider the simplest arrangement in which the binary coded control signal has successive digits of significance in a geometrical progression with a factor of two. In this case, the scaling means may comprise a succession of binary divider stages. The output pulses from each stage of the binary scaling means form a set of pulse frequencies each differing by a factor of two from the ones in the preceding stage. The gating means may comprise a plurality of AND gates, an AND gate being associated with the output of each stage in the binary scaling means. To one input of each AND gate is applied one of the digits of the binary number representing the control signal. Each AND gate input corresponds to a digit position in a digital number representing the level of power which is to be passed by said controlled rectifier means.

To take a specific example, if there is provided an input pulse frequency of 100 pulses per second, the first stage will produce an output at 50 pulses per second, the second stage 25 pulses per second, the third stage 12½ pulses per second and so on. If the first and third AND gates were opened by appropriate control signals, the controlled rectifier means would be triggered 62½% of the total number of times that it could be for all the pulses in the input train. This proportion coincides with the binary significance of the number assumed to be connected to the AND gates. Accordingly, with the present invention the average power supplied to a load may be controlled by means of a controlled rectifier in direct relationship to a number available in suitable digital form at the appropriate gates. The number may be related to a variable in a process which has to be controlled and may be an error signal such that the power supplied reduces the error.

Means may be provided for deriving said input pulse train from said alternating supply source. Conveniently said input pulse train has a frequency twice that of said alternating supply source and said control being arranged to conduct for half cycle each time it is triggered.

Assuming that the pulses in the output circuit are applied directly to the controlled rectifier means so that each pulse triggers a rectifier for half a cycle, then the average power in the power circuit will be directly proportional to the digital number controlling the AND gates.

The alternating power supply will commonly be alternating mains supply at a frequency of 50 or 60 cycles per second. A pulse train at twice the supply frequency may readily be obtained by full wave rectification of a signal at the mains frequency, thereby giving a pulse train at exactly twice the mains frequency.

A single binary scaling means may be used in conjunction with a number of different loads to which power is to be controlled, each load having an associated set of AND gates to which the appropriate control signal in digital form is fed. Thus each set of AND gates can synthesise the appropriate pulse frequency required for the respective loads.

In some cases, where the power to a load is to be controlled in accordance with the sum of two or more input variables, two or more sets of AND gates may be arranged to provide non-coincident pulses for feeding to a single controlled rectifier means for controlling the power to a single load.

Instead of feeding the pulses in the output circuit direct to the controlled rectifier, means may be provided for modifying the pulse frequency to introduce an integral or derivative or other functional component of the control signal into the output. This may be done using the output pulses rather than the input control signals. With a controlled rectifier system feeding a load, the output power is necessarily always positive and thus, with a proportional control system, the input control signal always represents a positive qauntity, namely the amount of power to be fed to the load. In principle, this may vary from zero to a maximum value. With derivative control, the derivative may be negative and with integral control, it is inherent that the signal to be integrated should be a signal varying about a zero datum, i.e. it may sometimes be positive and sometimes negative. Thus if integral and/or derivative control is used or is combined with proportional control, the input control signal must define the sign as well as the amplitude of a quantity and the pulses to the controlled rectifier system must normally be at some predetermined level, usually to give 50% of the maximum power, so that the control can be effective to vary the power in either direction from this level.

Pulse trains can be used to represent a number which is either positive or negative by using two sets of pulse trains on separate leads. For integration, means may be provided for feeding the pulses on two wires from said output circiut to a bi-directional counting circuit so as to give a binary number on the various stages of the counting circuit proportional to the integral, with respect to time, of the process variable (that is the digital number controlling the gating means). This counting circuit may be arranged to control a further set of AND gates similar to those previously described so as to produce a new pulse frequency proportional to the integral and provided these pulses are non-coincident with the previously mentioned output pulses, they may be combined therewith to control the rectifier. The required non-coincidence may readily be obtained by introducing a delay if necessary. Similarly a derivative component may be obtained by providing feedback over an integrating stage as described above. Such a derivative component may be combined with a proportional component and possibly with an integral component to control the rectifier.

Instead of operating on the output pulses to provide integral and derivative components, the operation may be performed on the original digital number representing the variables so that the number together with the appropriate proportions of its integral and/or derivative are combined for example in parallel addition circuits before being applied to the aforementioned set of AND gates which provide the basic pulse output to be fed to a controlled rectifier.

In the following description reference will be made to the accompanying drawings, in which.

Figure 1:
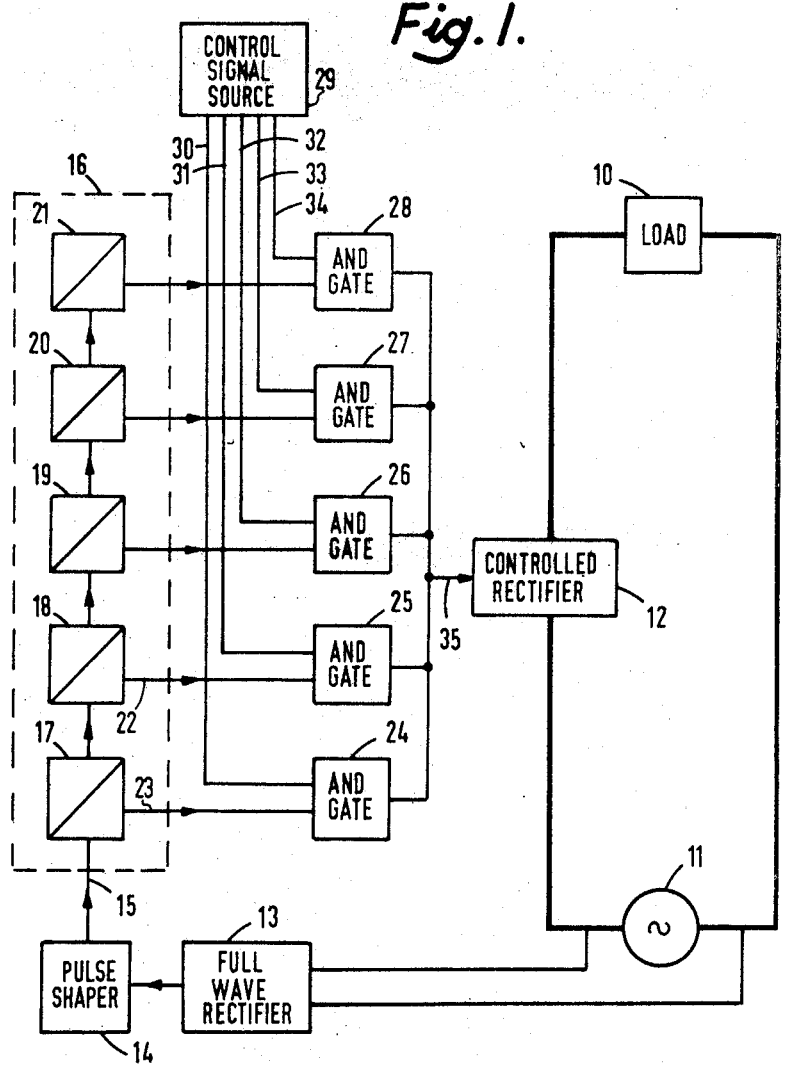
FIGURE 1 is a block diagram illustrating a circuit for controlling electrical power in accordance with a digital input.

Referring to FIGURE 1 there is illustrated diagrammatically a load 10 energised from an alternating current source 11, typically a mains supply, and the power through the load is controlled by means of a silicon-controlled rectifier system 12. In this particular example, it will be assumed that the source 11 is a mains supply at a frequency of 50 cycles per second. A pulse train at a frequency of 100 cycles per second is obtained from this mains supply by means of a full wave rectifier 13 and a pulse shaper 14 giving the pulse train output on a lead 15. This train of pulses is fed to a binary scaling unit 16 which, in this particular example, is illustrated as having five separate stages 17 to 21 each dividing the frequency in two. Each binary stage has two output lines to which are fed alternately the input pulses to the binary stage. Thus on each line the pulses are at half the frequency of the input to the stage and the two sets of output pulses are non-coincident. One of the output lines, for example the line 22 from stage 17, leads to the next binary stage whilst the other output line, e.g. line 23 from stage 17, leads to one input of an AND gate. There are five of these AND gates 24 to 28, one assoicated with each of the binary dividing stages. Each AND gate has a second input which is a binary digital contnrol signal from a control signal source 29. The most significant number of the binary signal is fed via line 30 to the AND gate 24 associated with the highest frequency and the successive digits in decreasing order of significance are applied to the successive gates 25 to 28 via lines 31 to 34.

If the mains frequency is 50 cycles per second, the pulse shaper 14 will produce an output at 100 pulses per second and hence the input to the gate 24 is at 50 pulses per second. The input to gate 25 is at 25 pulses per second and so on.

To take a specific example, if it is desired to obtain an output level which is 62.5% of a maximum, the AND gates 24 and 26 may be opened so that 62.5 pulses per second are provided. 50 of these pulses per second come from the AND gate 24 and 12.5 per second from AND gate 26. These pulses are inherently non-coincident because each successive binary divider stage in scaling unit 16 is fed with pulses which are non-coincident with the output pulses fed to the AND gate of the previous stage. All the outputs from the AND gates 24 to 28 are combined in a common output lead 35 and are fed as trigger signals to the silicon-controlled rectifier means 12. In the embodiment illustrated, the logical elements are such that this can be done by feeding all the trains of pulses onto a common output lead. It will be understood however that, with some types of logical elements, it will be necessary to use an OR gate for combining the outputs from the AND gates.

In the particular example taken above, 62.5 pulses per second will be fed to the rectifier means. Each pulse applied to a control electrode of a silicon-controlled rectifier would cause the rectifier to conduct for one half cycle and, in this particular case, the rectifier system must inherently be a full wave rectifier system so that 62½ pulses of power can be fed to the load 10 each second. Two rectifiers in the system are connected with opposite polarity. All the input pulses are applied to both rectifiers. For each input pulse one or other of the rectifiers, dependent on the instantaneous polarity of the mains supply, will fire to give a half cycle of power to the load. The pulse shaper 14 can be arranged to time the pulses so that they occur at the start of the half cycles of the alternating supply.

For convenience, the input pulse train of FIGURE 1 has been assumed to be 100 pulses per second derived from the supply mains. It will be apparent, however, that if for some reason it were desired to limit the maximum power supplied to the load to, say ⅓ of its normal maximum, it could be arranged that the input on line 15 comprised only every 3rd pulse derived from full-wave rectification of the supply.

It is often required to provide a control depending on the integral of an error signal input, taking into account the sign of the error signal. In the system shown in FIGURE 1, the pulse frequency is simply proportional to the digital number controlling the AND gates 24 to 28. In this example, the digital number may be regarded as 10100.

Figure 2:
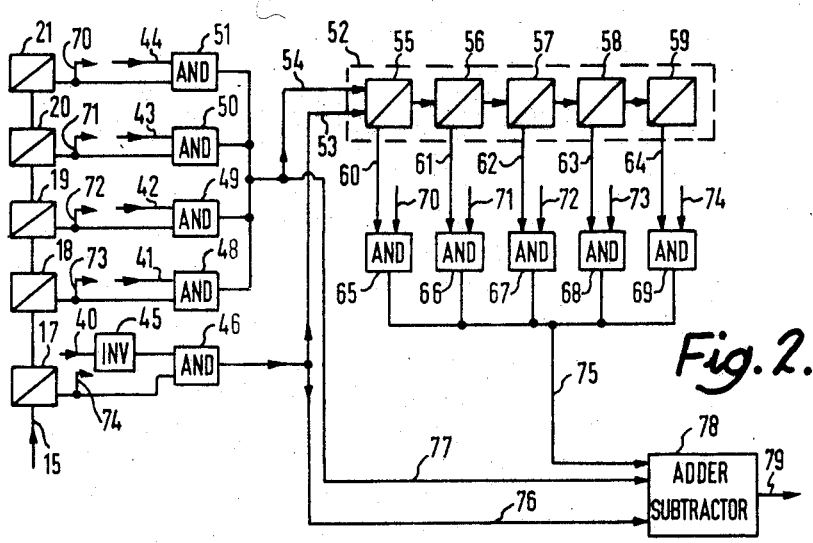
FIGURE 2 is a diagram illustrating a modification of the arrangement of FIGURE 1 to provide proportional and integral control.

The system shown has no provision for a change of sign. In general however, the input variable (i.e. the controlling digital number) may be either positive or negative with a respect to a datum. In circuits where the output on line 35 may have to be integrated, it would be necessary to ensure the counters used for integration were bi-directional. Conveniently the most significant AND gate has means for inverting the corresponding most significant digital output. Such a modification is illustrated in FIGURE 2. The input forming the binary control signal is applied to lines 40 to 44 with the most significant digit (i.e. the sign digit) applied to the line 40 and so on in descending order of significance. The most significant digit from the line 40 is fed through an inverter 45 to an AND gate 46. The inputs from lines 41 to 44 are applied to AND gates 48 to 51. To the AND gates 46 to 51 are fed trains of pulses respectively from the binary dividers 17 to 21.

A number which can be either positive or negative can be represented by trains of pulses by using a two wire system; in the simplest arrangement, pulses on one wire represent positive units and pulses on the other wire negative units. The input control signal must use some arbitrary convention to convey sign information as well as magnitude and, in the embodiment to be described, the convention employed is that a number $x$ where $$-\tfrac{1}{2} \leq x < +\tfrac{1}{2}$$

is represented by $x+\tfrac{1}{2}$ so that the control signal is a number in the range 0 to nearly 1. In the arrangement of FIGURE 2, this convention is employed in the following way: the number representing the control signal applied on lines 40 to 44 is made up with the numerical convention that the most significant digit, that is the one on the line 40, is the sign digit. Where the input number is positive, the sign digit is 1 and the remaining digits express the required number in binary code. Where the input number to be presented by the control signal is negative, the sign digit on line 40 is made zero and the remaining digits express the complement of the number.

Thus the number 11111 represents + 1111
Thus the number 10000 represents    0000
Thus the number 01111 represents − 0001
Thus the number 00000 represents −10000

The outputs from the AND gates 46 to 51 are fed to a bi-directional counter 52 having a decrementing input 53 and an incrementing input 54. The output from the AND gate 46 is fed into the decrementing input 53 of this counter whilst the outputs from the other AND gates 48 to 51 are fed into the incrementing input 54. The bi-directional counter consists essentially of a chain of binary dividers 55 to 59 and provides outputs on five lines 60 to 64 representing the integral of the input signals taking into account their sign. These outputs are used to control five AND gates 65 to 69 to which are fed pulses trains from the aforementioned binary dividers 21 to 17 respectively on leads 70 to 74. The combined output from these AND gates 65 to 69 is thus a series of pulses representing the required integral signal and this appears on an output lead 75, which is common to all the AND gates 65 to 69.

To take the example shown above, which has a unity digit in the position of greatest significance and unity digit in the position of third greatest significance there would be no output from the first stage because the inverter 40 would change that stage from open to "closed" (i.e. the number 10100 to 00100). Accordingly, the pulses would enter the incrementing input 54 of the counter at a rate of 12.5 pulses per second. If the most significant digit is now changed to a zero the counter 52 will have an input of 50 pulses per second on its decrementing input 53 and 12.5 pulses per second on its incrementing input 54 so that it will decrease its count at a mean rate of 37.5 pulses per second. The total count in the counter, by means of the AND gates 65 to 69, controls the rate of output pulses from these AND gates. It may be desirable to incorporate inhibiting means in the bi-directional counter to enable it to inhibit all further input pulses on its incrementing lines when it reaches its maximum count or on its decrementing lines on reaching minimum count. This will prevent a counter from changing suddenly from one extreme count to the other on being completely filled or emptied.

In general it will be required to combine an integral signal with a proportional signal. To obtain the proportional signal, the outputs on the lines 53, 54 are used. These are fed by lines 76, 77 respectively into an adder-substractor unit 78 into which is also fed the output from the AND gates 65 to 69 on lead 75. The unit 78 gives an output on a lead 79 for feeding to the rectifier unit 12 controlling the power to the load. It will be noted that in combining the signals no account has been taken of the sign of the number in the bi-directional counter 52. The reason for this is that the resulting pulse train is to be used to fire controlled rectifiers and hence no significance can be attached to a negative output. A result of this is that the integral in the bi-directional counter 52 will settle to the value required in the output circuit to maintain zero error, typically ½, that is, 50%. A negative input control signal will decrease the proportional term so reducing the power below 50% (asuming that the integral term is still ½). A positive input will increase the proportional term.

This point may be considered in another way. Suppose E is an error signal to be used to control power in a controller employing both proportional and integral control. Negative power cannot be supplied and thus one must have a datum level of positive power supplied to the load, the actual power varying above or below this in accordance with the output of the controller. In the convention referred to above, the input control signal will be a number $E+\tfrac{1}{2}$. The pulses on leads 53, 54 together (and hence also on lead 76, 77) represent E. The counter integrates this up or down from the normal value of ½ and thus the output on lead 75 can vary between 0 and nearly 1. The pulses on 76, 77 together also represent E and thus also vary from 0 to nearly 1. The total possible output from the adder-subtractor 78 would thus range from 0 to 2 and this unit 78 would therefore include range limiting logic if necessary.

In the arrangement of FIGURE 2 the adder-subtractor unit 78 has to combine two sets of pulses. There is a possibility that coincident pulses may occur in the two sets fed to the adding unit 78 in the arrangement of FIGURE 2 where pulses are derived ultimately from the same source. To ensure proper introduction of pulses from one line into gaps in the pulse train of the other so as to provide a pulse frequency which is the sum of the two, the circuit of FIGURE 3 may be used as the unit 78. In describing FIGURE 3, it is convenient to refer to pulses on line 71 which have ot be subtracted as "negative" pulses. In this circuit, the signals on the two input lines 75, 77 together with signals on line 76 inverted by an inverter 80 are fed into an AND gate 81 and also into an OR gate 82. The AND gate 81 gives an output only if coincident pulses are present on lines 75 and 77 and there is no negative pulse on line 76, i.e. there is a pulse to be fed to the output and a pulse to be carried forward. The output of AND gate 81 provides one of these inputs to an OR gate 93 which feeds the output line 79. If a pulse is received on either line 75 or line 77 or if there is no pulse on line 76, then the OR gate 82 gives an output which is inverted in an inverter 83. There is thus an output from this inverter only if there is no positive pulse on line 75, 77 and there is a negative pulse on line 76.

The outputs on lines 75, 77 are combined in an AND gate 84, the outputs of line 75 and inverter 80 are combined in AND gate 85, and the outputs of line 76 and inverter 80 are combined in AND gate 86. The outputs of gates 84, 85, 86 are fed to an OR gate 87 which thus gives an output whenever there is one positive pulse to be counted provided there is no simultaneous negative pulse or two positive pulses with or without a simultaneous negative pulse, that is, the sum of the three inputs is +1 or +2. This output from the OR gate 87 is fed to an inverter 88 and thence to an AND gate 89 and is also fed directly to an AND gate 90. A clock pulse source 91 provides further inputs to each of these AND gates 89, 90 at each successive time instants at which output pulses can be used on line 79 for firing the controlled rectifier system. The output from the OR gate 87 is fed directly also to an AND gate 92 which has another input to be described later and which provides a second input to the output OR gate 93. The output from the inverter 83 is fed to an AND gate 94 which has a clock pulse input from the clock pulse source 91 and a third input from a bistable 95 when the latter is clear as a result of an input from AND gate 89. In this condition, the bistable 95 provides also the second input to the aforementioned AND gate 92. In the opposite (set) condition bistable 95 provides an input to a two-input AND gate 96. The AND gate 96 receives a second input from the aformentioned OR gate 82 and provides a third input to the output OR gate 93. The bistable 95 is set by means of a three-input AND gate 97 which receives inputs firstly from the clock pulse source 91, secondly from the AND gate 81 and thirdly from a bistable 98 when the latter is clear as a result of an input from the AND gate 90. The bistable 98 is set by the output from the AND gate 94. In the clear condition, the bistable provides an input to the AND gate 97 and an input to the AND gate 92.

Figure 3:
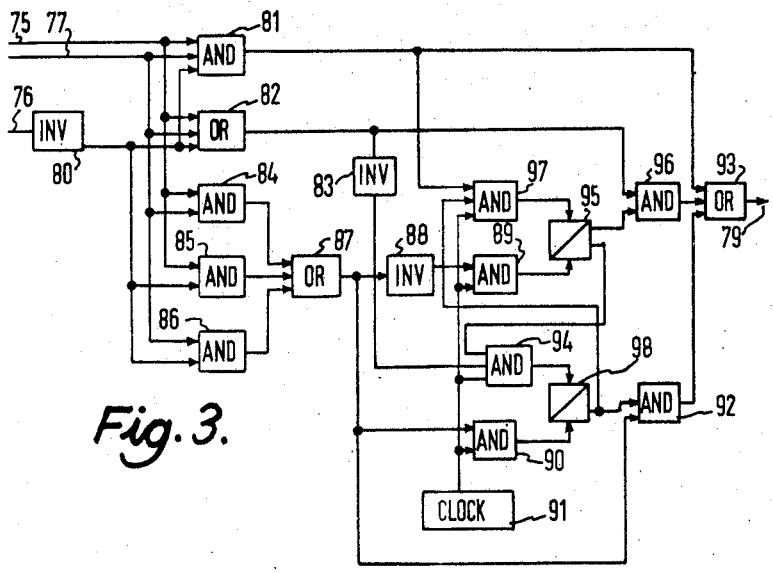
FIGURE 3 is a diagram illustrating a circuit for combining trains of pulses.

The circuit of FIGURE 3 operates in the following way. Input lines 75 and 77 each represent +1, while input line 76 represents −1. The total input can therefore be −1, 0, +1, or +2. The two bistables 95 and 98 are used to store +1 or −1 respectively, in their set condition (upper output active), when necessary. The circuit is required to give an output pulse if (a) the total input is +2, or (b) the total input is +1 and the bistable 98 ("−1") is not set, or (c) the total input is 0 and the bistable 95 ("+1") is set. In addition, the current clock pulse may be required to set or clear the bistables 95 and 98. Bistable 95 ("+1") must be set if the total input is +2, and bistable 98 ("−1") is not set; it must be cleared if the total input is −1 or 0. Bistable 98 ("−1") must be set if the total input is −1, and bistable 95 ("+1") is not set; it must be cleared if the total input is +1 or +2.

AND gate 81 gives an output when the total input is +2 OR gate 82 gives an output when the total input is anything other than −1. AND gates 84, 85, and 86 each respond to one of the combinations by which the total input can be at least +1, so OR gate 87 gives an output whenever the total input is +1 or +2. Inverter 83, fed by OR gate 82, gives an output when the total input is −1. Inverter 88, fed by OR gate 87, gives an output when the total input is −1 or 0.

AND gate 92, fed by OR gate 87 and the inverse output of bistable 98, gives an output when the total input is +1 or +2, and there is no "−1" stored in bistable 98. AND gate 96, fed by OR gate 82 and bistable 95, gives an output when the total input is 0, +1, or +2, and "+1" is stored in bistable 95. Hence the output OR gate 93, fed by AND gates 81, 92, and 96, gives an output when (a) the total input is +2, or (b) the total input is +1 or +2, and bistable 98 ("−1") is not set, or (c) the total input is 0, +1, or +2, and bistable 95 ("+1") is set. Since the two bistables are never set simultaneously, the case +1 in (c) is included in (b), and the case +2 in (b) and (c) is included in (a). Thus the output requirements listed above are met.

AND gate 97, fed by AND gate 81, inverse output of bistable 98, and the clock pulse, gives a pulse output when the total input is +2, and the bistable 98 ("−1") is not set. This output sets bistable 95 ("+1") as required. AND gate 89, fed by inverter 88 and the clock pulse, gives a pulse output when the total input is −1 or 0, which clears bistable 95 as required.

AND gate 94, fed by inverter 83, the inverse output of bistable 95, and the clock pulse, gives a pulse output when the total input is −1, and the bistable 95 is not set. This output sets bistable 98 ("−1") as required. AND gate 90, fed by OR gate 87 and the clock pulse, gives a pulse output when the total input is +1 or +2, which clears bistable 90 as required.

Figure 4:
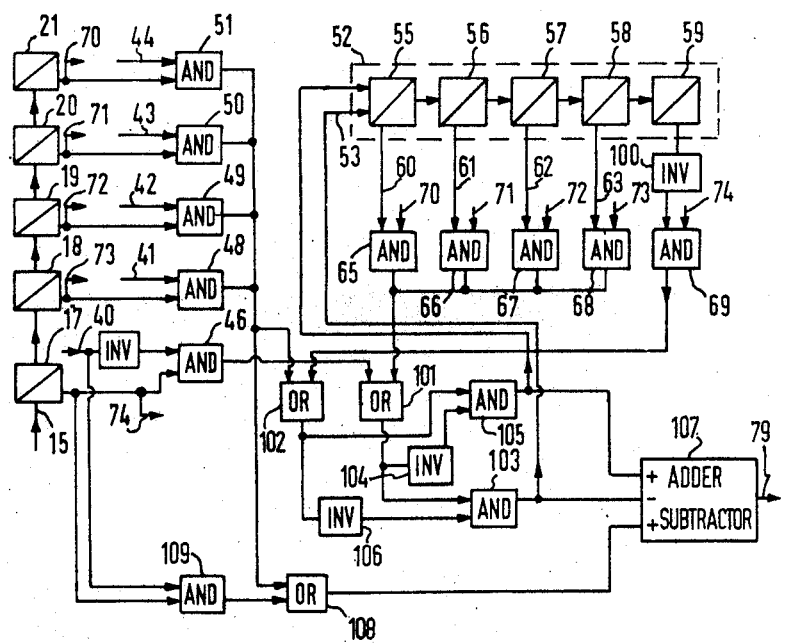
FIGURE 4 illustrates a modification of the arrangement of FIGURE 1 for providing proportional and derivative control.

FIGURE 4 illustrates an arrangement in which combined proportional and derivative control is obtained. This arrangement is very similar to the proportional and integral control systems of FIGURE 2 and corresponding reference numerals are used to indicate corresponding elements. In the following description mention will be made only of the distinctive features of FIGURE 4. For derivative control, the outputs from the AND gates 65 to 69 are fed back to the input of the counter 52. For derivative control, account has to be taken of the sign of the number in the counter because it has to be fed back to the input and thus the outputs from the AND gates 65 to 68 are fed back to the decrementing input 53 of the counter. The last stage of the counter 59 has an inverter 100 in the lead to the AND gate 69 and the output from this AND gate 69 is fed back to the incrementing input 54 of the counter 52. In the arrangement illustrated, it will be seen that this feedback to the input of the counter and the combination of these feedback signals with inputs from gates 46 and 48 to 51 is achieved by feeding the signals from AND gates 65 to 68 and the signals from gate 46 to an OR gate 101 whilst the signals from AND gate 69 and from AND gates 48 to 51 are fed to an OR gate 102. The output from OR gate 101 is fed directly to an AND gate 103 and via an inverter 104 to an AND gate 105. The output from OR gate 102 is fed directly to AND gate 105 and via an inverter 106 to the AND gate 103. The AND gates 103 and 105 provide the required inputs to the counter at 53 and 54 respectively. It will be seen that this arrangement inherently provides non-coincident signals for the counter. It will be seen that the pulses from the AND gates 65 to 68 are combined with those from the AND gates 46 to 51 in such a manner as effectively to subtract from them. This is because the pulses from the AND gate 69 indicating that the number in the counter is negative are fed to the incrementing input 54 whilst those from the AND gates 65 to 68 are fed to the decrementing input 53. The various pulses can be combined in this simple way since the pulses from the AND gates 65 to 68 can never coincide in time with pulses from AND gate 46 whilst the pulses from AND gate 69 can never coincide with pulses from AND gates 48 to 51. By this feedback, the net pulse input to the bi-directional counter 52 will fall to zero when the number in the counter becomes equal to the input variable. It will then increase or decrease only when the input variable increases or decreases. Thus the net input to the counter is proportional to the derivative with respect to time of the variable. This net input to the counter is derived as a difference between the incrementing and decrementing inputs to the counter and may be positive or negative. To make use of the derivative, the outputs of the AND gates 105 and 103 are fed to an adder-subtractor 107 where they are combined with a proportional signal obtained from an OR gate 108. Since the derivative may be negative and since there cannot be a negative output to the load, the system is arranged to provide half power with zero input. For this reason input to OR gate 108 is taken directly from AND gates 46 and 48 to 51 and from an AND gate 109 to which are fed pulses from scaler stage 17 and the control signal on line 40. It will be seen that if the derivative component is negative, the adder-subtractor 107 will be effective to feed to line 79 a number of pulses below the number from OR gate 108 whereas, if the derivative component is positive, the adder-subtractor 107 will cause the output pulses on the lead 79 to be increased above those from the OR gate 108.

If three term control is required, that is to say proportional and integral and derivative control, the output pulses from the AND gates 103 and 105 can be fed into the adder-subtractor 78 of FIGURE 2 in addition to the inputs on leads 75, 76 and 77. If this is done, the output pulses on lead 79 would then contain proportional, integral and derivative terms.

In the examples described above, only five binary stages have been shown. In practice, it would often be necessary to have a larger number to give adequate discrimination. The effective time constants of integration and differentiation can be selected by dividing down or multiplying up the input pulse frequencies to the bi-directional counters by appropriate factors. If binary steps in the possible time constants are acceptable, a counter can be used having more stages than would normally be required and the time constant choice is effected by choosing at what stage in the counter to introduce the pulses to be counted.

In some control system the input variable may not be a simple binary coded signal but may be in a different numerical system such as a binary coded decimal system. In this case the same circuit may be used provided the input pulse trains, instead of being obtained from a single divider chain such as the chain 17 to 21, are arranged to have the appropriate pulse frequencies. For example if the input pulse control signal is in binary decimal code, the stages 17 to 21 might be binary stages connected as a binary decimal counter. More generally, control signals other than binary digits could be employed, e.g. a decimal code could be used with decimal scaling means.

The present invention thus provides a method of controlling electric power using entirely digital circuits without any necessity for highly stable amplifiers and carefully stabilised power supplies normally asociated with such circuits. It will be appreciated that all the normal controls on electrical controllers can be provided; for example, a change in time-constants of integration may be provided by arranging to divide down the input pulse frequency to an integrating bi-directional counter by a suitable factor, or, if binary steps in the possible time-constants are acceptable, by using a counter having many more stages than would normally be required and then choosing at what stage in the counter to introduce the pulses to be counted.

In some cases it may be required to effect the control in accordance with the product of two quantities such as the flow of a fluid in a pipe and the departure of the temperature of this fluid from a datum. This may be achieved by using a binary scaler 16 and AND gates 24 to 28 as in FIGURE 1 to produce pulses on the line 35 representative of one of these quantities, e.g. the flow of the fluid, and to feed the pulses from the line 35 into a second binary scaler with which is associated a series of AND gates similar to the construction employed in FIGURE 1, the second set of AND gates being controlled in accordance with the second of the quantities, e.g. the temperature deviation. The resultant output from the second set of AND gates would thus be proportional to the product of the two input quantities and might be used, for example, to control a heater for the fluid.

This aspect of the invention may readily be extended to the relating of the pulse output to the product of a plurality of variables by the use of a corresponding number of binary scaling means, the output of the gating means from each scaling means feeding the input of the next scaling means, with the last scaling means feeding said controlled rectifier and each gating means set in accordance with a respective one of said said plurality of variables.

It is also possible for the system described to provide always pairs of pulses so that the control would be effected by selecting the proportion of whole cycles to be supplied to the load rather than half-cycles as shown in the circuits illustrated.

I claim:

1. A system for controlling power in an electrical circuit in accordance with a digital control signal comprising an input pulse train source providing a respective series of electrical pulses, scaling means fed from said input pulse train source, which scaling means provide non-coincident output pulses at frequencies corresponding in decreasing order, to the decreasing significance of successive digits of the control signal, gates for controlling the feeding of said output pulses to a common output circuit, control means for said gates responsive to said digital control signal and arranged to feed output pulses of the respective frequencies to said output circuit in accordance with the magnitudes of the corresponding digits of the digital control signal, the digit of highest significance controlling the pulses from the scaling means at the highest frequency, and the successive digits of lesser significance controlling the pulses at the successive lower frequencies, a source of alternating power having a frequency at least as high as the maximum frequency of pulses in said output circuit, triggered power control means in said electracial circuit for controlling the power from said source, and means for triggering said triggered power control means in succession by the various pulses in said output circuit.

2. A system as claimed in claim 1 wherein a binary coded control signal is employed with successive digits of significance in a geometrical progression with a factor of two and wherein said scaling means comprises a succession of binary divider stages.

3. A system for controlling power as claimed in claim 2 wherein the first stage of said binary scaling means is arranged to give an output pulse for each alternate pulse from said input pulse train and is arranged to feed the other pulses to the second stage, the second stage giving an output for each alternate pulse at its input and feeding the other alternate pulses to the third stage and so on.

4. A system for controlling electrical power as claimed in claim 2 wherein said gates comprise a series of AND gates, one for each output frequency from the binary scaling means.

5. A system for controlling electrical power as claimed in claim 1 wherein means are provided for deriving said input pulse trains from said alternating supply source.

6. A system for controlling electrical power as claimed in claim 5 wherein said input pulse train has a frequency twice that of said alternating supply source and wherein said triggered power control means is a controlled rectifier means arranged to conduct for a half cycle each time it is triggered.

7. A system for controlling electrical power as claimed in claim 1 wherein the input control signal is capable of representing a number which may be either positive or negative and wherein a two wire output circuit is provided from said gates, the control signal providing pulse train outputs on said two wires from the scaling means to represent a positive or negative power requirement and wherein there are provided a bi-directional counter arranged to integrate the pulse trains on said two wires, and giving a digital output, and gates controlled by the output from said counter and arranged to control further pulse trains from the scaling means so as to provide an integral component for combination with a proportional component provided from the scaling means under the direct control of said control signal.

8. A system for controlling electrical power as claimed in claim 1 wherein the input control signal is capable of representing a number which may be either positive or negative and wherein there are provided further gates coupled to said scaling means, a bi-directional counter with overall negative feedback to control said further gates so as to provide pulse trains from the scaling means and thereby give a derivative component, and means for combining the output from said further gates with a proportional component provided from the scaling means under the direct control of said control signal.

9. A system for controling power in an electrical circuit as claimed in claim 2 wherein the binary coded control signal represents a signal which may be either positive or negative and wherein said gates are arranged to provide an output representing the magnitude of the control signal and wherein there are provided a bi-directional counter, means for feeding the pulses from said gates to said counter, further gates controlled by the output of the bi-directional counter for controlling trains of pulses from said scaling means, and means for non-coincidently combining the output trains from said further gates with the output trains from the first mentioned gates to give control signals to said triggered power control means system.

10. A system for controlling electrical power as claimed in claim 9 wherein means are provided for feeding the output trains from said further gates back to the input of the counter as a negative feedback so that the net input to the counter is proportional to the derivative of the control signal.

11. A system for controlling electrical power as claimed in claim 2 wherein said binary coded control signal is coded so that the most significant digit is a sign digit and the remaining digits represent positive numbers in a simple binary code and negative numbers in the complement of a simple binary code and wherein there are provided an inverter for inverting the most significant digit in the control signal, means for feeding the inverter output to the gate for the highest pulse frequency, means for feeding the remaining digits of the control signal to the gates for the successive lower frequencies, a bi-directional counter having an incrementing input and a decementing input, means feeding the output pulses from the gate for the highest pulse frequency into said decrementing input, means feeding the output pulses from the remaining gates into said incrementing input and gates controlled by the output of the counter for controlling the application of pulse trains from said scaling means to said triggered power control means.

12. A system for controlling electrical power as claimed in claim 11 wherein means are provided for non-coincidently combining the output pulses controlled by the counter with further pulse trains from said gates directly controlled by said control signal.

13. A system for controlling electrical power as claimed in claim 2 wherein said binary coded control signal is coded so that the most significant digit is a sign digit and the remaining digits represent positive numbers in a simple binary code and negative numbers in the complement of a simple binary code and wherein there are provided an inverter for inverting the most significant digit in the control signal, means for feeding the inverter output to the gate for the highest pulse frequency, means for feeding the remaining digits of the control signal to the gates for the successive lower frequencies, a bi-directional counter having an incrementing input and a decrementing input, means feeding the output pulses from the gate for the highest pulse frequency into said decrementing input, means feeding the output pulses from the remaining gates into said incrementing input, further gates controlled by the output of the counter for controlling the application of trains of pulses from said scaling means to give a negative feedback into the incrementing and decrementing inputs of the counter and means for additively or subtractively combining, according to the sign of the counter output, the output pulses from the further gates non-coincidently with trains of pulses obtained from said scaling means via gates controlled directly by said control signal without inversion of the sign digit.

14. A system as claimed in claim 9 wherein the means for non-coincidently combining pulses includes means responsive to the coincidence of two pulses to provide a delayed pulse at the next time instant at which the triggered power control means system can be triggered.

15. A system for controlling power in an electrical circuit in accordance with a digital control signal comprising an alternating current supply for said circuit, controlled rectifier means in said circuit, means providing a train of pulses, scaling means to which said train of pulses is fed and which produces a number of trains of pulses at lower frequencies which frequencies correspond to the significance of successive digits of said control signal, separate gates for each of said trains of pulses at said lower frequencies, means applying the various digits of the control signal to the respective gates, and means for non-coincidently combining the output of said gates and for applying the combined outputs to said controlled rectifier means.

16. A system as claimed in claim 15 wherein said means providing a train of pulses comprises rectifying means rectifying said alternating current.

17. A system as claimed in claim 15 and including a bi-directional counter processing the outputs from said gates to provide an integral control signal consisting of further trains of pulses and means for combining said integral control signal with the outputs of said gates.

18. A system as claimed in claim 15 and including a bi-directional counter with negative feedback processing the outputs from said gates to provide a derivative control signal consisting of further trains of pulses and means for combining said derivative control signal with the outputs of said gates.

References Cited

UNITED STATES PATENTS 3,287,622 11/1966 Eckenfelder et al. __ 307—252 X
3,329,887 7/1967 Schaeve _____ 323—22
3,354,377 11/1967 Leeds _____ 323—22

OTHER REFERENCES

IBM Technical Disclosure Bulletin, "Pulse Train Generator," vol. 2, No. 1, pp. 14, 15, June 1959.

W. M. SHOOP, JR., Primary Examiner

W. H. BEHA, JR., Assistant Examiner

U.S. Cl. X.R.

323—22, 24